United States Patent [19]

Schaub

[11] Patent Number: 4,492,393

[45] Date of Patent: Jan. 8, 1985

[54] PIPE RESTRAINT DEVICE

[75] Inventor: Erwin L. Schaub, Manhasset, N.Y.

[73] Assignee: Parker Hannifin Corporation, Brooklyn, N.Y.

[21] Appl. No.: 297,574

[22] Filed: Aug. 31, 1981

[51] Int. Cl.³ ............................................. F16L 21/00
[52] U.S. Cl. .................................... 285/236; 285/373; 285/419; 285/420; 24/275; 24/283; 24/286
[58] Field of Search ................ 285/236, 373, 419, 420; 24/275, 276, 277, 279, 283, 284, 286

[56] References Cited

U.S. PATENT DOCUMENTS

| | | |
|---|---|---|
| 1,388,731 | 8/1921 | Long . |
| 1,451,731 | 4/1923 | Higdon . |
| 2,395,745 | 2/1946 | King . |
| 3,109,215 | 11/1963 | Brown . |
| 3,359,017 | 12/1967 | Schaub . |
| 3,565,468 | 2/1971 | Garrett . |
| 3,627,353 | 12/1971 | Bleumenfeld . |
| 4,026,586 | 5/1977 | Kennedy, Jr. . |
| 4,101,151 | 7/1978 | Ferguson ............................ 285/236 |

FOREIGN PATENT DOCUMENTS

| | | | |
|---|---|---|---|
| 660795 | 7/1929 | France ................................ 285/236 |
| 984592 | 2/1951 | France ................................ 24/279 |
| 113188 | 2/1918 | United Kingdom .................. 24/279 |

Primary Examiner—Richard J. Scanlan, Jr.
Attorney, Agent, or Firm—Albert C. Johnston

[57] ABSTRACT

A pipe restraint device that will prevent pressure-induced separation of cast iron soil pipes or the like joined by a sealing coupling comprises at least one stiff yet forceably springable rod having lengths thereof curved to substantially the outside curvature of the pipe and forming two coils spaced apart for encircling respective pipe surfaces at opposite sides of the sealing coupling, with end portions of the rod or rods arranged in oppositely directed first and second pairs defining a contractable region of the coils; and structures including at least one rigid strut bracket formed to bridge the sealing coupling axially are engaged with the pairs of rod end portions for displacing them relative to one another substantially tangentially under great tension and holding them so displaced in immovably tight engagement upon the pipe surfaces. The coils can be formed by curved lengths of a single rod, or of two separate rods; or by two or more rods each prebent to a U shape or a closed loop form providing two curved lengths, with a rigid strut plate joining portions of these rods away from the strut bracket. Portions of the curved lengths away from the strut bracket are restrained axially by one or more tying members that bridge a sealing coupling and have edge channels underlying the rods. Such tying members in some forms serve also as the gasket confining shield of a pipe joint sealing coupling.

28 Claims, 21 Drawing Figures

PIPE RESTRAINT DEVICE

This invention relates to a restraint device that will prevent forcible separation of cast iron soil pipes or the like joined end to end by a sealing coupling. The invention relates also to an improved joint sealing coupling and a gasket shield component thereof for coacting with the restraint device.

Cast iron pipes used as soil pipe in residential and commercial building are conventionally joined and sealed end to end by couplings which comprise an annular gasket made of rubber or a similar elastomer. The gasket is formed with a radial rib to seat between and has cylindrical sleeve portions to receive the pipe ends, and it is pressed and sealed against them by a contractable structure such as a flexible shield of sheet metal clamped about the gasket. Among widely used forms of such pipe sealing couplings are those disclosed in U.S. Pat. Nos. 3,233,922 and 3,359,017. Other forms of them are disclosed in U.S. Pat. Nos. 3,565,468 and 4,026,586.

A problem has existed in the use of the known joint sealing couplings for soil pipe installations in multi-story buildings. It sometimes occurs that the soil pipe becomes obstructed near the ground level of the building so that, for instance in the event of heavy rainfall flowing to a roof drain, a column of water amounting for instance to some 30 feet, or even to as much as 60 to 70 feet or more, in height can build up in the pipe. The hydrostatic head of such a water column in the pipe will exert an extremely high pressure on a coupling near the ground level of the building. This pressure can force the coupled pipes to move apart in axial directions, thus moving their ends out of sealing engagement with the gasket and releasing the confined water so that it will flow out where the coupling failure occurs. Applicant and others have made experiments of various kinds in attempts to meet this problem, but without notable success before the present invention. The problem is complicated by the fact that cast iron soil pipe is brittle and high clamping loads localized against a limited region of the pipe will induce cracking of the pipe. A further complication usually exists in that the pipe conventionally is coated with a layer of tar which limits the axial separating force that can be counteracted by a band clamp or the like fastened onto the pipe.

The principal object of this invention is to provide a pipe clamping restraint device which will overcome the problem mentioned above, being effective to put the wall of the pipe under tangential compression over substantially its entire circumference and, further, to distribute the compressive load over a multitude of force points of small area, thus obtaining extremely high pressures against the pipe surface. The device will prevent axial separation of cast iron soil pipes or the like joined end to end by a sealing coupling when the hydrostatic pressure at the joint corresponds to that of a water column of 30 feet or more in height, or even up to 180 to 360 feet or more when so required. The invention thus enables increased safety of use of cast iron soil pipes of the plain end, or hubless, type with easily installed sealing couplings in multi-story buildings, with resultant savings in costs of the soil pipe installations.

Another object of the invention is to provide such a pipe clamping restraint device which can be retrofitted onto joints of existing soil pipe installations, or the like; also, one which keeps the sealing coupling of a joint sufficiently visible for inspection of its condition and detection of any leakage permitted by a coupling when subjected to high pressures by liquid in the pipe.

A further object is to provide a restraint device of the character mentioned and a gasket-compressing shield of a joint sealing coupling in a coacting relationship by which the shield serves not only for pressing and sealing the gasket against the coupled pipe ends but also as an axial restraining and pressure distributing component of the restraint device. A coupling shield structure serving these functions is another object and part of the invention.

In accordance with the present invention, a restraint device that will prevent pressure-induced separation of cast iron soil pipes or the like joined by a sealing coupling is provided which comprises at least one stiff yet forceably springable rod having lengths thereof curved to substantially the outside curvature of the pipe and forming two coils spaced apart for encircling respective pipe surfaces at opposite sides of the sealing coupling, with end portions of the rod or rods arranged in oppositely directed first and second pairs defining a contractable region of the coils; and means including at least one rigid strut bracket formed to bridge the sealing coupling axially are engaged with the pairs of rod end portions for displacing them relative to one another substantially tangentially under great tension and holding them so displaced in immovably tight engagement upon the pipe surfaces.

In an advantageous form of the invention, the rod end portions of each of the coils cross each other at and extend in opposite directions from the contractable region of the coils, and a rigid strut bracket formed to bridge a sealing coupling axially is provided with thrust structures on opposite sides thereof for retaining the pairs of rod end portions under ultra high tension. The tension is applied by holding a first pair of the rod end portions engaged onto one of the thrust structures while displacing the end portions of the other pair longitudinally relative to the bracket until they are immovably tight and then holding them under the tension by means thereon bearing against the other thrust structure.

The rod end portions of the first pair according to an embodiment of the invention are formed as leg portions of a Ushaped rod section of which the base portion is hooked upon a substantially tangentially extending tongue portion of the strut bracket.

A further advantage can be achieved by providing at opposite ends of the strut bracket depending feet which hold the portions of the coils that merge into the rod end portions of the first pair substantially in the respective diametrical planes of the tightenable rod end portions, the former rod end portions being bent outward from the bracket feet so as to extend to their retaining thrust structure by passing across the tightenable end portions at the outer sides of the latter. In this way a circularity of the coils can be maintained which avoids or minimizes disadvantageous moments that would tend to misalign the pipe ends under the ultra high force applied to the coils.

According to a particularly effective feature of the invention, a strut bracket provided with feet as described above is constituted by a pair of elongate rigid channel members which are formed to extend tangentially over and to opposite sides of the contractable region of the coils and are spaced apart and confined endwise between rigid thrust members which also are desirably of channeled form.

The portions of the coils that merge into the rod end portions of the first pair are disposed at the inner sides of bracket feet formed on opposite ends of one of the thrust members, from which they extend outwardly and upwardly into the channel members so that these rod end portions pass along the outer walls of the channel members to the other thrust member, to which they are fixed for example by being passed through openings in the thrust member and welded to it.

The tightenable rod end portions extend into the channel members so as to cross the rod end portions of the first pair at the inner sides thereof and then pass along the inner walls of the channel members to and through openings in the footed thrust member, and they are screw-threaded to receive nuts for drawing them through the openings to high tension with the channel members under compression between the thrust members.

By virtue of this channeled strut bracket arrangement, which preferably is employed with two unitary rod lengths each pre-bent to a circular form with crossing end portions, an almost perfect circularity of the coils can be obtained with the end portions anchored and confined so effectively that no bending or yielding of them with objectionable loss of restraining force will occur after the restraint device is applied and tightened onto the pipes at a joint.

In another embodiment of the invention, the curved rod lengths that form the coils are portions of two or more rods, i.e., unitary lengths of the same required rod stock, each of which is bent to a U-shaped form comprising leg portions interconnected by an axially disposed base portion and merging into curved lengths which constitute an arcuate section of the coils. Two of the rods present pairs of end portions formed to be engaged with the strut bracket and brought to high tension in one of the ways described above. Each rod, if any, other than these two has a closed loop form with tangential extensions joined by an axial connecting portion at each end of its curved lengths. For joining the rods where they meet away from the strut bracket, at least one rigid strut plate is provided, each of which is formed to bridge the sealing coupling and has at its opposite sides oppositely directed structures to hook and hold under tension, respectively, the adjacent axial connecting portions or base portions of two rods with the respective leg portions or tangential extensions thereof in crossing relation. A restraint device so comprising plural arcuate rod sections can be retrofitted onto sealed joints of existing pipe installations. Another advantage of this form of the invention is that each strut plate provides an axial restraint, additional to that of the strut bracket, for holding the curved rod lengths spaced apart at the required distance and preventing the pipes under pressure or torsion from forcing them farther apart at circumferential regions near the strut plate or plates.

For uses of the restraint device in forms made with curved rod lengths that individually cover a large part of the pipe circumference, e.g., an arc of more than about 60°, as in the case particularly of a device employing a single bent rod or two circularly bent rods, the device is installed in conjunction with axial restraining means for bridging the sealing coupling and engaging with the curved lengths to prevent them from being forced apart farther than their prescribed axial spacing at locations away from the strut bracket.

Such axial restraining means may be provided in the form of at least one unitary arcuate tying member formed to span the sealing coupling axially and having along its end borders radially depressed arcuate channel formations to receive the curved rod lengths and be gripped between them and the pipe surfaces. According to a further feature of the invention, each such tying member is provided as a rigid piece, preferably of steel or other hard metal, presenting along the channel formations narrow rigid strips which underlie the curved rod lengths and are spaced apart so that they concentrate the force of the curved rod lengths at a multitude of locations about the pipe surfaces.

In this way the required axial restraint can be obtained with secure bites of the channel strips through the usual tar coating and into the pipe surfaces beneath them when the coils are tensioned. In addition, the axial tying member or members may be formed with openings through them, as by being made of pieces of expanded metal, or may be spaced apart circumferentially, so that the sealing coupling spanned by them is kept sufficiently visible for inspection and for detection of any joint sealing defect that may develop.

According to a further feature of the invention, the axial restraining means also constitutes the flexible shield of the pipe joint sealing coupling, serving not only as an axial restraining and force distributing component of the restraint device but also for pressing and sealing the coupling gasket against the pipe ends.

In a special form of such a combined coupling shield and axial restraining means, the shield comprises a band of plastically stretchable sheet metal having a body portion formed with a width to span the coupling gasket axially, with a length slightly less than the outside circumference of the gasket and with depressed lateral extensions along the opposite borders of the body portion, and having on the ends of the body portion means for contracting the band about the gasket so as to stretch the body portion into a substantially closed cylinder, thus confining the gasket and pressing it tightly onto the pipe ends in an annular space bordered by the stretched body portion and the depressed lateral extensions. Preferably, a bridge piece of the sheet metal is formed to underlie the ends of the body portion and span the gap between them as the band is being stretched.

The above-mentioned and other objects, features and advantages of the invention will be further apparent from the accompanying drawings and the following detailed description of illustrative embodiments of the invention. In the drawings.

Figures 1, 2, 3, 4, 5:
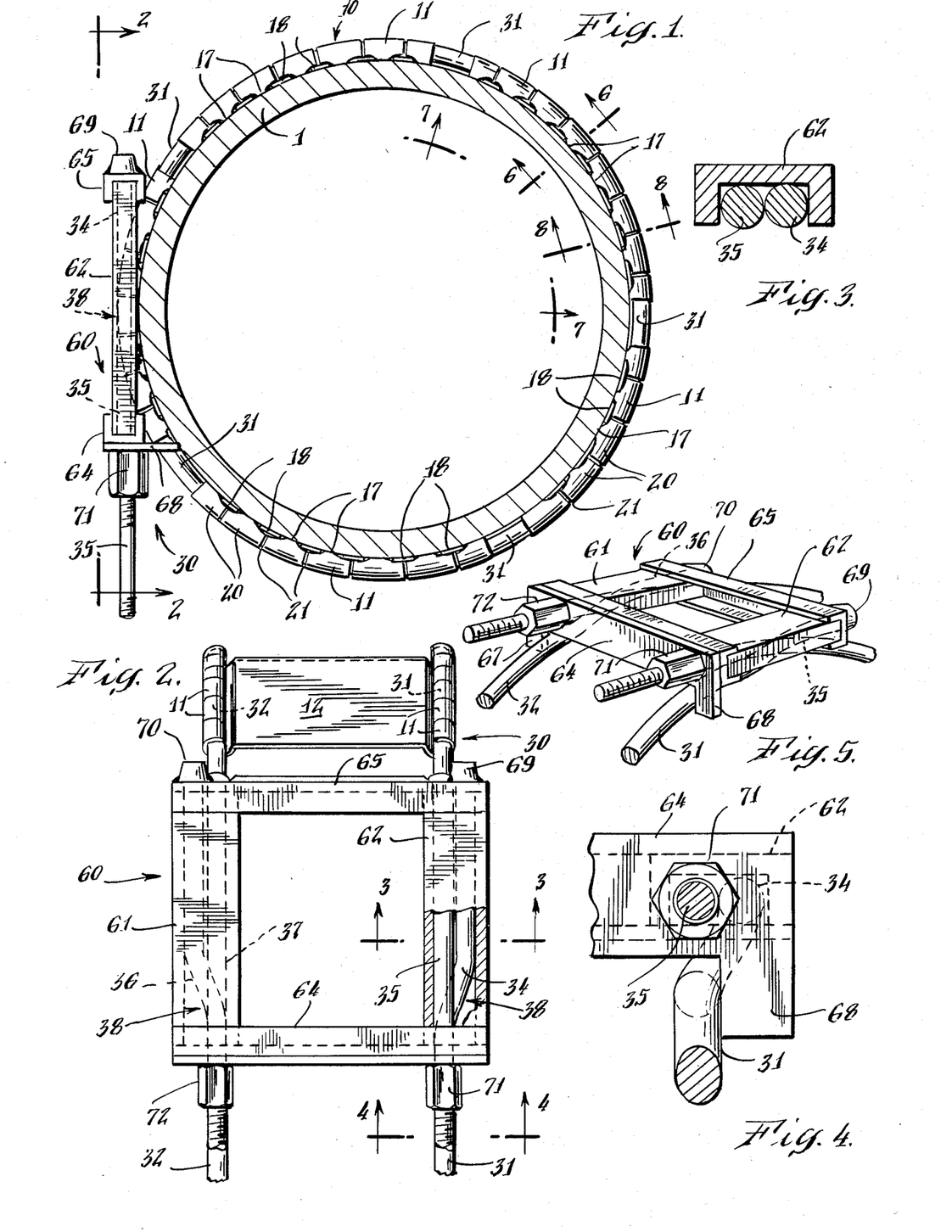
FIG. 1 is an end elevational view, partly in section, of a restraint device according to a preferred embodiment of the invention.
FIG. 2 is a side elevational view along line 2—2 of FIG. 1, showing the strut bracket and portions of the rods of the restraint device.
FIG. 3 is a cross-sectional view of a channel member of the strut bracket and rod end portions therein, taken along line 3—3 of FIG. 2.
FIG. 4 is an elevational view, partly in section, of structures at an end of the strut bracket, taken at line 4—4 of FIG. 2.
FIG. 5 is a perspective view of the structures of FIG. 2.
Figures 6, 7, 8, 9:
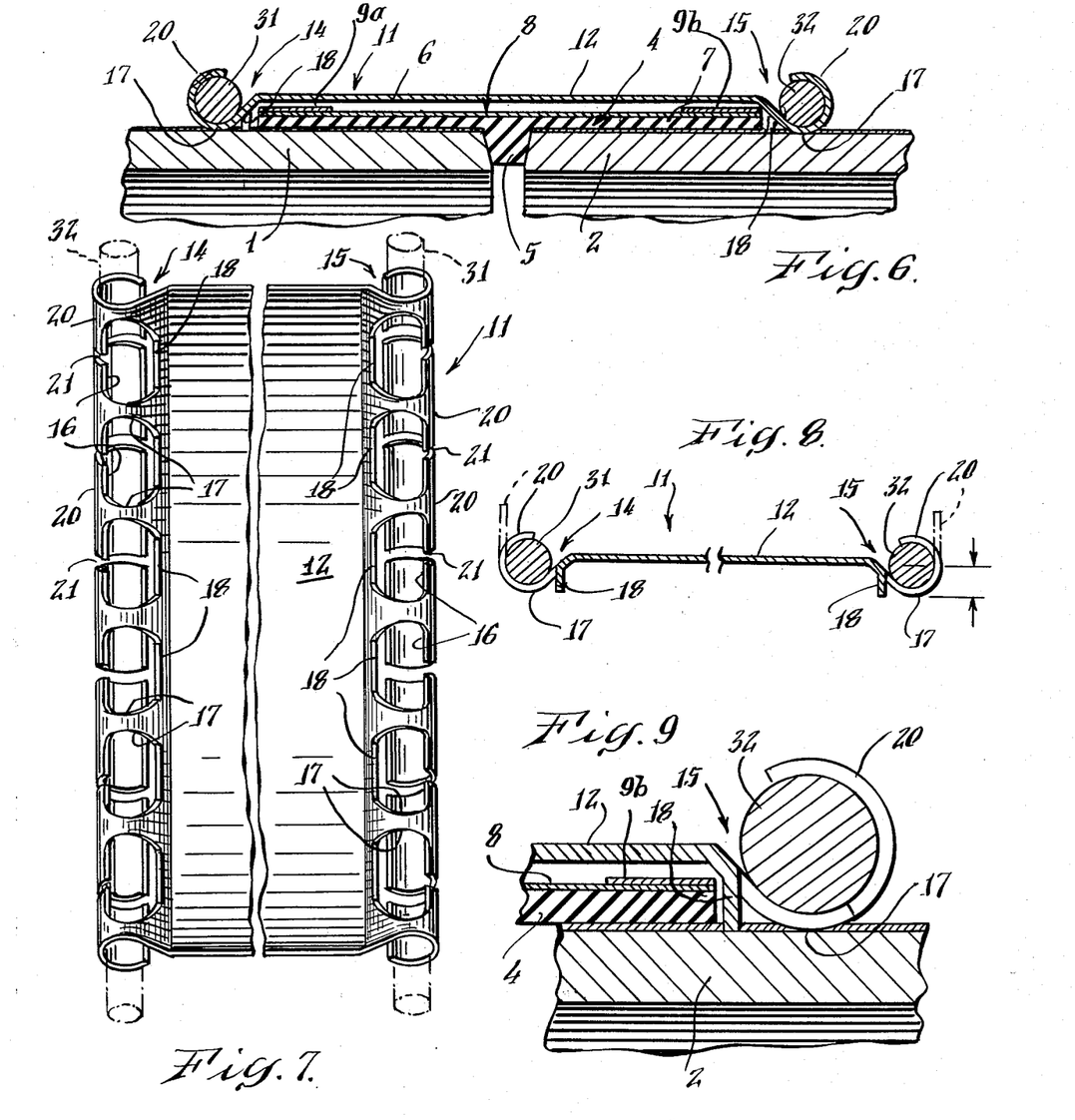
FIG. 6 is an enlarged axial cross sectional view of the assembly, taken along line 6—6 of FIG. 1.
FIG. 7 is an elevational view, taken along line 7—7 of FIG. 1, of an arcuate rod tying member of the assembly.
FIG. 8 is a cross sectional view of an arcuate rod tying member, taken at line 8—8 of FIG. 1, with broken line indications of a manner of joining such member to the rods of the restraint device.
FIG. 9 is an enlarged view of structures at one end of the assembly of FIG. 6.

The pipe restraint assembly illustrated in FIGS. 1 and 6 of the drawings comprises two cast iron pipes 1 and 2 of the hubless, or plain end, type commonly used for soil pipe installations. These pipes are aligned end to end and sealed together by a sealing coupling comprising an annular rubber gasket 4 which is held in place by a sheet metal shield 8 clamped about the gasket by band clamps 9a and 9b.

The gasket 4 may be of a well known type providing a central radial rib portion 5 to be engaged between the adjacent ends of the pipes and cylindrical sleeve portions 6 and 7, respectively, formed to receive the pipe ends and to be held pressed against the encompassed pipe surfaces by the shield 8.

The ends of the pipe 1 and 2 are strongly gripped together in a way preventing separation of them under the influence of high hydrostatic pressures in the pipe, by a restraint device 30 which comprises two substantially circular coils 31 and 32 of stiff yet forceably springable round spring steel rod stock that can be drawn to immovably tight engagement against the surfaces of the pipe at opposite sides of the sealing coupling. In the embodiment of FIGS. 1-6 the coils 31 and 32 are formed by two rods that have respective end portions 34, 35 and 36, 37 which cross in and extend substantially tangentially away from a contractable region 38 of the coils. At opposite sides of that region pairs of the rod end portions are engaged with and can be displaced and held tangentially under great tension in relation to a rigid strut bracket 60 which bridges the sealing coupling axially and is disposed tangentially over the contractable region 38.

Each of the coils 31 and 32 in the embodiment of FIGS. 1-6 is formed by an integral piece of the steel rod stock which is pre-bent circularly over most of its length to nearly the curvature of the pipe for which the device is to be used. For pipe of about four inches outside diameter the rod is for instance of about 0.2 inch in diameter, thus enabling a tension of about 2,000 pounds or more to be maintained by each coil. For pipe of about 10 inches outside diameter the rod preferably is of about 0.3 inch, e.g. 0.322 inch, in diameter, so that a tension of 6,000 pounds or more can be maintained by each coil.

The strut bracket 60 as shown in FIGS. 1-4 is constituted by a pair of elongate rigid channel members 61 and 62 which are formed to extend over and tangentially to opposite sides of the contractable region 38 of the coils and are spaced apart and confined endwise between rigid thrust members 64 and 65, which preferably are also of channeled form as shown but can be of other forms such, for example, as being opposite side portions of a unitary rigid plate. The thrust member 64 is formed with notches to receive portions of the rods at the inner sides of feet 67 and 68 depending from its opposite ends. The rod end portions 35 and 37 of one pair extend into the channel members 62 and 61, respectively, and then along their inner side walls to and through openings formed in the footed thrust member 64. These rod end portions are made to be tightenable relative to the strut bracket and the rod end portions of the other pair; for instance, by being screw threaded to receive nuts 71 and 72 for drawing them through the openings in thrust member 64 to high tension.

The rod end portions 34 and 36 of the other pair emerge from portions of the coils 31 and 32 disposed in the notches at the inner sides of the feet 67 and 68 and extend from these notches outwardly and upwardly into the channel members 61 and 62 so as to cross the rod end portions 35 and 37, respectively, at their outer sides (see FIGS. 2 and 3). The end portions 34 and 36 then extend from the contractable region 38 along the respective outer side walls of the channel members 61 and 62 and through openings in the thrust member 65, where they preferably are fixed rigidly to the thrust member 65; for instance, by being headed and welded to member 65 as indicated at 69 and 70.

It will be noted that the portions of the coils which merge into rod end portions 34 and 36 are held against the bracket feet 67 and 68 at locations lying in substantially the same diametrical planes as the rod end portions 35 and 37 which are tightenable by the nuts 71 and 72. When the rods are tightened they are under high tension, while the channel members 61 and 62 correspondingly are in compression, and the thrust members 64 and 65 accept the moment loads of the rods so as to keep them from twisting the strut bracket. As a result, even when extremely high forces are applied to the coils 31 and 32 by tightening the rods that form them, an almost perfect circularity of the coils can be maintained with the rod end portions anchored and disposed so effectively that no bending or yielding of them with objectional loss of restraining force will occur after the restraint device is applied and tightened in place onto the surfaces of two pipes at a joint. This assured circularity of the coils under ultra high tension also prevents the creation of turning movements that would tend to displace coupled pipe ends out of axial alignment.

It will be apparent that when the pairs of rod end portions extending from the coils 31 and 32 are assembled with the strut bracket 60 as above described and the assembly is tightened onto the surfaces of two joined pipes at opposite sides of a sealing coupling, the strut bracket 60 will itself prevent the coils and the pipe surfaces engaged by them from being moved apart axially in the region of the strut bracket. In the absence of further axial restraining means, however, the coils would be displaceable farther apart at regions away from the strut bracket by an angular movement of a coupled pipe end, with a risk of loss of the required sealing action of a sealing coupling. Such axial displacement or divergence of the coils is prevented in the embodiment of FIGS. 1-6 by the several arcuate sections 11 of a tying structure 10, which in this embodiment serve not only as axial restraining means for tying members for the coils 31 and 32 in regions away from the strut bracket 60 but also for distributing the force on the coils to a multitude of localized areas of high pressure against the surfaces of the coupled pipes.

In an assembly as shown in FIG. 1, which is suitable for instance for pipe of 10-inch outside diameter, the tying structure 10 comprises several of the arcuate sections 11, for instance five (5) of them, with each section 11 covering an arc of about 65° to 70°. Thus, relatively small angular spaces may be left open between the adjacent ends of the arcuate sections 11 to enable inspection of the pipe sealing coupling and easy detection of any deterioration or leak occurring in the gasket.

Each axial tying member 11, as shown more particularly in FIGS. 1 and 6-9, is an arcuately shaped unitary piece of rigid sheet material, such for example as sheet steel of about 0.050" in thickness, having a body portion 12 formed to bridge over the sealing coupling and having along opposite borders of the body portion radially depressed arcuate channel formations 14 and 15 which are formed to receive lengths of the coils 31 and 32 and be gripped between them and the surfaces of the pipe ends 1 and 2.

Along each channel formation the material of each arcuate section, or axial tying member, is formed with a series of openings 16 which are separated from one another by axially disposed rigid strips 17 that underlie the coils 31 and 32. The strips are sufficiently narrow and spaced apart so that they concentrate the pressure of the tightened coils at limited locations about the pipe surfaces, in a way enabling the coils more readily to bring about penetration of the usual tar coating with digging into or impression of the metal of the pipe surfaces, as indicated in FIG. 6 or FIG. 9.

In the illustrated embodiment, each tying member 11 is provided with arcuate series of downturned support lips 18 along its opposite sides, between the body portion 12 and the adjacent channel formations 14 and 15, to bear against the pipe surfaces along the circumferential side edges of the gasket 4. The support lips 18 may be welded to the under side of the body portion, but preferably they are formed as integral downward protrusions from its side edges at the inner sides of the openings 17. It has been found that the support lips 18 aid in preventing the axial tying member from becoming distorted under extreme hydrostatic loads applied to a pipe joint fitted with the restraint device.

According to a further feature of the illustrated embodiment, the channel formations of each axial tying member 11 are bordered along their outer sides by strips 20 which are integral with the pressure concentrating strips 17. The strips 20 may each be a continuous strip, but for ease of assembly they preferably are subdivided into portions separated from each other by slits 21. The outer strips 20 initially extend upward from the strips 17, as indicated by broken lines in FIG. 8, so that member 11 can be fitted over the curved lengths of the coils 31 and 32, or vice versa, with the rods of the coils seated against the strips 17. Then the outer strips 20 are bent over the coils to hold the axial tying member 11 preassembled onto the restraint device.

FIGS. 10-15 illustrate a somewhat different form of a pipe restraint device in accordance with the invention and, further, a manner of utilization of a restraint device with a joint sealing coupling that comprises a unitary shield serving both for compressing the sealing gasket and as an axial tying member for coils of the restraint device.

Figures 10, 14:
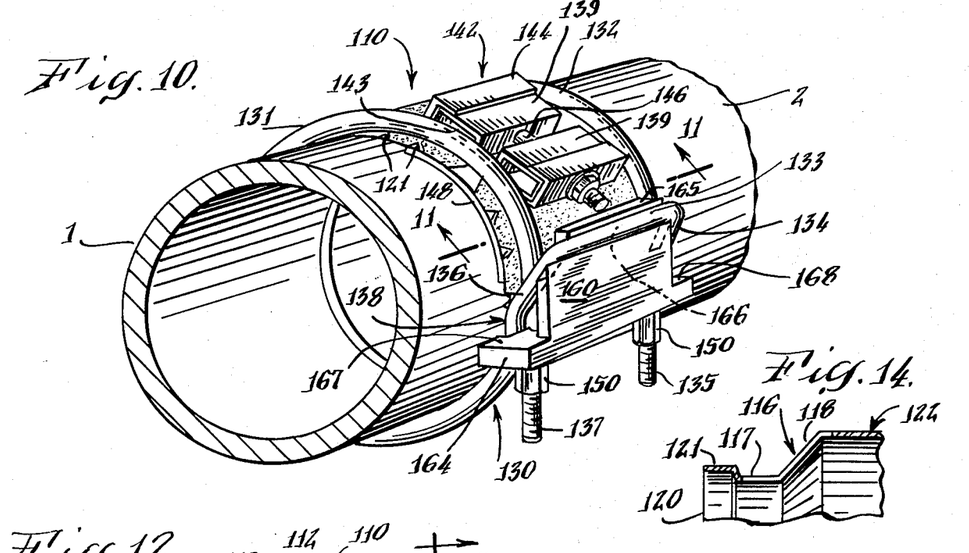
FIG. 10 is a perspective view of pipe ends assembled with another form of a combined restraint device and sealing coupling according to the invention.
FIG. 14 is an enlarged fragmentary sectional view of a lateral channel formation of the gasket shield, taken along line 14—14 of FIG. 12.
Figures 12, 13, 13A, 15:
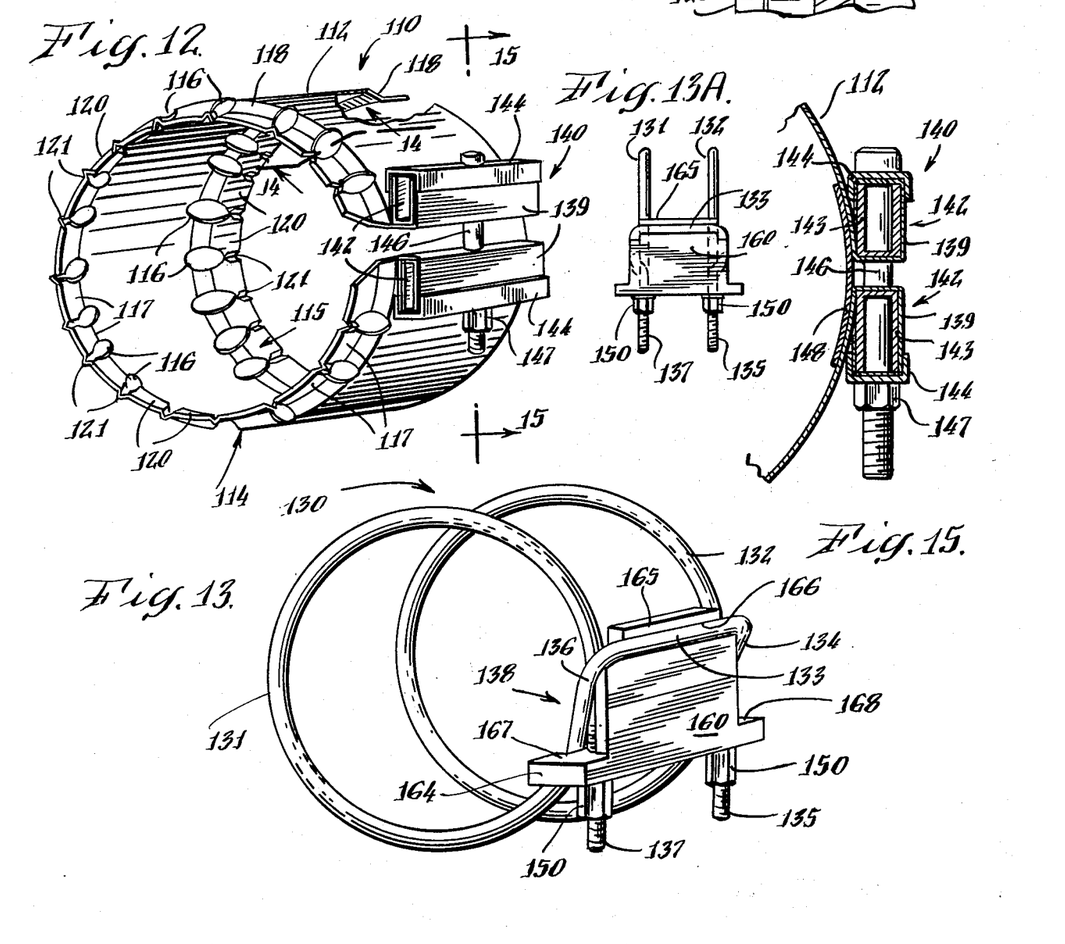
FIG. 12 is a perspective view of the gasket shield component of the assembly of FIG. 10.
FIG. 13 is a perspective view of the restraint device thereof.
FIG. 13A is a side elevational view of the strut bracket and rod end portions of the same restraint device.
FIG. 15 is an enlarged cross-sectional view of the band contracting, or tightening, means of the gasket shield, taken along line 15—15 of FIG. 12.

The restraint device 130, as shown in FIGS. 10 and 13, comprises two coils 131 and 132 which are formed by bending a single section of the required rod stock to a U-shaped and doubly circularly curved form. Rod end portions 135 and 137 of a first pair extend tangentially and substantially straight from a contractable region 138 of the coils and are screw threaded from their ends. Rod end portions 134 and 136 of a second pair extend from the coils substantially tangentially but somewhat outwardly and upwardly beyond the contractable region, so as to cross the outer sides of end portions 135 and 137 as legs of a connecting base portion 133 of the U-shaped rod.

A rigid strut bracket 160 bridges the contractable region 138 and is formed with thrust structures on opposite sides of the bracket for retaining the pairs of rod end portions under ultra-high tension. One of the thrust structures comprises a substantially tangential bracket tongue portion 165 formed with an axially disposed groove 166 to hook under the rod base portion 133. The other thrust structure comprises an end wall 164 of the bracket having openings therethrough to receive the threaded rod end portions 135 and 137 slidably so that nuts 150 screwed onto the rod ends will bear against end wall 164 and will contract the coils tangentially. The end wall 164 is also formed at its opposite ends with depending feet 167 and 168 to hold in notches at their inner sides the portions of the coils that merge into the rod end portions 134 and 136.

The restraint device 130 can be assembled for use by passing the straight rod end portions 135 and 137 through the openings in the end wall 164 of strut bracket 160, hooking tongue portion 165 under the rod base portion 133 that connects the leg portions 134 and 136 and screwing the nuts 150 onto the threaded rod ends. The device can be fitted onto pipe ends with the coils 131 and 132 engaged against pipe surfaces at opposite sides of a sealing coupling, and can then be tightened by the nuts 150 to such great tension that the pipe surfaces will be gripped immovably in relation to the curved rod lengths forming the coils. The strut bracket 160, again, provides rigid restraint against relative displacement of the gripped pipe ends in a region of up to about 60° to either side of the contractable region 138 of the coils.

Figure 11:
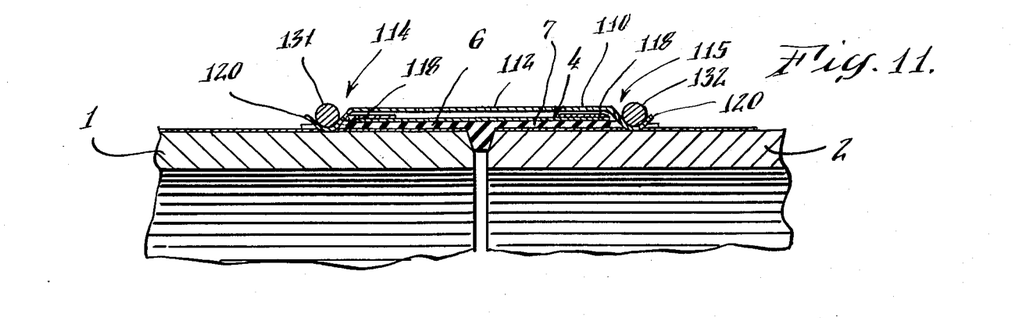
FIG. 11 is an enlarged axial cross-sectional view of parts of the FIG. 10 assembly, taken along line 11—11 of FIG. 10.

In order to tie the coils and pipes against axial displacement in other regions of the pipe circumference, the sealing coupling in this embodiment is provided with a unitary gasket shield 110 comprising a body portion 112 formed to span the gasket 4 axially and having depressed lateral extensions 114 and 115 which form channels to receive the pipe gripping coils along the opposite borders of the body portion.

Each lateral extension is formed with inner side wall portions 118 to confine an edge of the gasket, and with a series of openings 116 separated by axial strips 117 that underlie the coils so as to be gripped between them and the pipe surfaces. Edge strips 120 of the shield material along the outer side of the openings 116 are formed with upstruck projections 121 which bear against the outer sides of coils 131 and 132 to keep the shield 110 and the coils in parallel relation on the pipe ends.

The gasket shield 110 in the embodiment of FIGS. 10–15 can be made advantageously of a band of plastically stretchable sheet material such, for instance, as 18-8 chromium-nickel stainless steel sheeting about 0.008 to 0.014 inch thick in annealed to partially hard tempered condition. The band body portion 112 is formed initially with a width to span the gasket 4 axially and with depressed lateral extensions as described above, but with a length slightly less than the outside circumference of the gasket; and the ends of the band are provided with means 140 for contracting them together so as to stretch the body portion into a substantially closed cylinder about the gasket. For this purpose, each end 139 of the band is fixed to a bar member 142 disposed across the band end and the two bar members are interconnected by at least one headed bolt 146 extending tangentially through them and each engaged by a nut 147 so that by screwing the nut onto the bolt, the band ends can be drawn together so strongly that the band body portion 112 is stretched about the gasket confined beneath it. Each bar member 142 preferably is formed by a channel bar 143 that is relatively deep, or long in tangential direction, and a relatively shallow channel bar 144 that fits over a bar 143 so that a band end portion 139 wrapped about the bar 143 is clamped onto it by the bar 144. The side walls of the deeper channel bars 143 confine the bolt 146 so that the force applied as the bar members are drawn together is kept in the tangential direction of the ends of the band body portion 112.

An arcuate strip 148 of thin sheet material, for instance, the sheet metal used to make the shield 110, may be inserted beneath the ends of the band body portion 112 to bridge the gap between them so that the gasket 4 will not be extruded outward into that gap when the shield is being tightened in place. It is also advantageous to apply a little water or other suitable lubricant between the gasket and the body portion 112 when the shield is being contracted in place, as this lets the shield slip on the gasket to distribute the stretching force evenly throughout the circumference of band body portion 112.

FIGS. 16–19 of the drawings show an embodiment of the invention in which a retrofittable restraint device 200 providing two coils for gripping surfaces of pipes 1 and 2 at opposite sides of a joint sealing coupling 240 is constituted by two rods 201 and 202 which are pre-bent to doubled substantially half-circular forms and have respective pairs of substantially tangentially extending end or leg portions that cross and are connected together in a contractable region 204 through a strut bracket 205, and in a diametrically opposite region 210 by a strut plate 211. The rods 201 and 202, again, may each be a unitary length of a round steel rod stock such as that described above.

Rod 201 is bent to a U-shaped form providing an axially disposed base portion 220 interconnecting leg portions 221 and 222 which merge into curved lengths extended into substantially tangential end portions 225 and 226 which pass through openings in an end wall 206 of the thrust bracket 205 and are threaded to receive nuts 227 for drawing them to ultra high tension against the thrust bracket.

Rod 202 is bent to a U-shaped form providing an axially disposed base portion 230 interconnecting end portions 231 and 232 which merge into curved lengths 233 and 234, respectively. These curved lengths merge into substantially tangential but somewhat outwardly extending leg portions 235 and 236 which are joined together by an axial connecting portion 237. Thus, the rod 202 has substantially the form of a nearly rectangular trapezoid bent to provide somewhat divergent half-circular portions 233 and 234 extending between pairs of tangential end portions joined by the axially disposed base portions 230 and 237.

Figure 19:
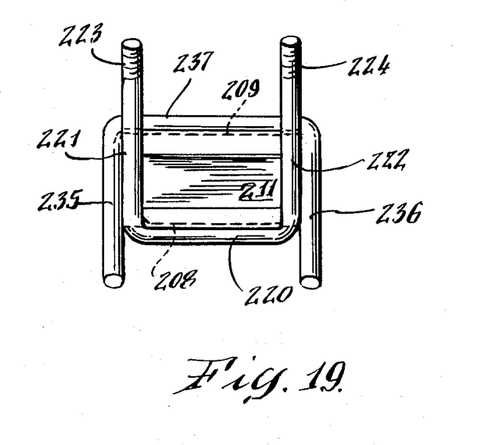
FIG. 19 is an elevational view of a strut plate connecting end portions of the rods of the restraint device, as viewed of FIGS. 19—19 of FIG. 18.
Figure 20:
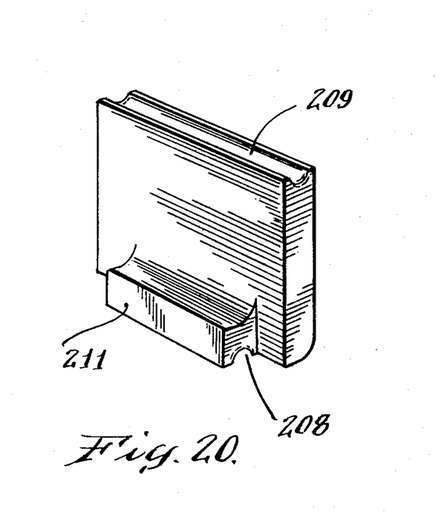
FIG. 20 is a perspective view of a strut plate of the device of FIGS. 16-19.

The axial base portion 220 of rod 201 is fitted and may be fixed, as by welding, onto an inner peripheral seat 208 formed on the strut plate 211. This strut plate also has an outer peripheral seat 209, facing oppositely to seat 208, onto which the axial connecting portion 237 of rod 202 is hooked with its leg portions 235 and 236 crossing the leg portions 221 and 222 of rod 201 at the outer sides of the latter. At the other ends of the curved lengths 233 and 234, the end portions 231 and 232 of rod 202 cross the end portions 225 and 226 of rod 201 at the inner sides thereof and have their connecting base portion 230 hooked onto a tongue portion 207 of the strut bracket 205.

The restraint device 200 can be assembled onto pipe ends 1 and 2 that already are coupled together by a sealing coupling 240. The sealing coupling may be of any of the forms commonly used for cast iron soil pipe or the like. As shown, it comprises a sealing gasket 4 having a radial rib portion 5 and sleeve portions 6 and 7, a flexible sheet metal shield 242 wrapped around the gasket, and two clamp bands 243 and 244 which encircle the shield 242 and are held tightened upon it by respective worm drive units 245 and 246 so that the gasket 4 is held firmly sealed against the pipe ends. The restraint device can be applied to the pipe surfaces at opposite sides of the coupling 240 by placing the curved lengths 223 and 224 of rod 201 against those surfaces at one side of the pipe; hooking the connecting portion 237 of rod 202 onto seat 209 of the thrust plate and hooking the base portion 230 of rod 202 onto tongue 207 of the thrust bracket 205; and then tightening the nuts 227 onto the end portions 225 and 226 of rod 201 until the two coils formed, respectively, by the curved rod lengths 223 and 233 and the curved rod lengths 224 and 234 are drawn to the high tension required for gripping into the pipe surfaces so that the pipe ends will be substantially immovable one relative to the other. The gripping force of the curved rod lengths is applied evenly over nearly the entire circumference of the pipe, thus avoiding cracking or deformation of the pipe that otherwise would be likely to occur under this high force.

Figures 16, 17, 18:
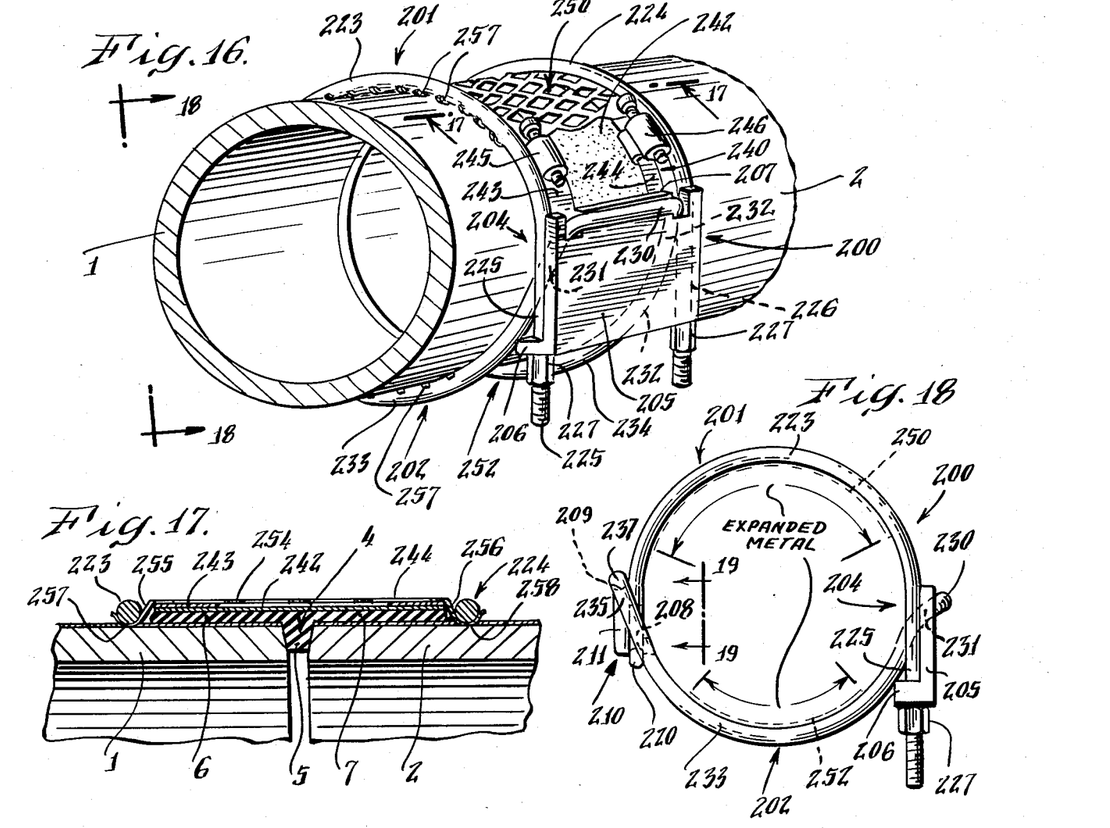
FIG. 16 is a perspective view of a retrofittable form of the restraint device assembled on pipe ends joined by a sealing coupling.
FIG. 17 is a cross-sectional view taken along line 17—17 of FIG. 16.
FIG. 18 is an end view taken along line 18—18 of FIG. 16.

In the contractable region 204 of the coils and in their opposite, connecting region 210, the curved rod lengths and the pipe ends engaged by them are prevented from being displaced axially one relative to the other by their respective connections with the strut bracket 205 and the strut plate 211. In the intervening circumferential regions relative axial displacement of the curved rod lengths 223 and 224, or 233 and 234, is prevented by the provision of arcuate axial tying members 250 and 252 which bridge the sealing coupling 240 axially and have depressed border formations to receive the curved rod lengths and be gripped between them and the underlying pipe surfaces. The tying members 250 and 252 may be similar to the members 11 of FIGS. 1-9. As shown in FIGS. 16, 17 and 18, they are shaped pieces of expanded metal, each having an arcuate body portion 254 to overlie a region of the gasket shield 242 and clamp bands 243 and 244, with depressed side walls 255 and 256 along opposite side edges of the gasket 4 and channel-shaped lateral extensions 257 and 258 to underlie the curved rod lengths 223 and 224, or 233 and 234, respectively. The open areas of the expanded metal pieces keep the bridged regions of the sealing coupling sufficiently visible for inspection of the condition of this coupling. The lateral extensions 257 and 258 provide substantially axially disposed rigid metal strips beneath and spaced apart along the curved rod lengths, which strips, like the strips 17 of FIGS. 1 and FIGS. 6-8, concentrate the pressure exerted by the coils of the restraint device and thus enhance the ability of the restraint device to dig through a tar coating into secure gripping engagement with the metal of the pipe surfaces.

I claim:

1. A restraint device to prevent axial separation of two cast iron pipes or the like joined end to end by a sealing coupling, comprising:
   at least one stiff yet forceably springable rod having lengths thereof pre-bent circularly to substantially the outside curvature of the pipes and forming two coils spaced apart axially a distance sufficient for said coils to encircle respective surfaces of said pipes that border said coupling at opposite sides of said coupling, each of said coils having at least nearly its entire length disposed on a single plane perpendicular to the axis of said coils,
   said at least one rod having substantially tangentially extending end portions thereof arranged in oppositely directed pairs defining a contractable region of said coils,
   axial restraining means to engage against said pipe surfaces and engaged with and interconnecting at least major portions of the respective lengths of said coils for constraining said coils to said distance of axial spacing, and
   means for displacing respective rod end portions of said pairs one relative to another substantially tangentially and holding them displaced under tension sufficiently great to contract said coils and said restraining means into immovable tight engagement upon said pipe surfaces.

2. A restraint device according to claim 1, said rod end portions of each of said coils crossing each other at said region and extending in opposite directions therefrom,
   said displacing means comprising a rigid strut bracket formed to bridge said sealing coupling axially at said region, said bracket having on opposite sides thereof rigid thrust structures for retaining said pairs of rod end portions under tension, and means on each of said rod end portions of one pair for displacing the same and holding the same displaced longitudinally relative to said bracket and the crossing rod end portion of the other pair under said tension.

3. A restraint device according to claim 2, said strut bracket comprising elongate rigid channel members extending tangentially over said contractable region to opposite sides thereof and confined endwise and axially spaced apart between said thrust structures, the respective rod end portions of said pairs extending oppositely from said region in and along said channel members to said thrust structures, the rod end portions of the other of said pairs extending through and being fixed to one of said thrust structures, and the rod end portions of said one pair extending through openings in the other of said thrust structures and having said displacing and holding means thereon.

4. A restraint device according to claim 3, said other thrust structure having feet depending from its opposite ends, the portions of said coils that merge into the rod end portions of said other pair being disposed at the respective inner sides of said feet and spaced beneath the rod end portions of said one pair and extending from said feet upwardly and outwardly into said contractable region at the respective outer sides of the rod end portions of said one pair.

5. A restraint device according to claim 4, each of said thrust structures being an elongate channel of substantially U-shaped cross section having ends of said channel members fitted inside the U shape.

6. A restraint device according to claim 2, the rod end portions of the other pair comprising legs of a U-shaped section of a said rod interconnected by a base portion thereof, one of said thrust structures comprising a substantially tangential tongue portion of said bracket formed with an axially disposed groove to hook under said base portion.

7. A restraint device according to claim 2, 3, or 6, said rod end portions of said one pair comprising substantially straight, screw-threaded extensions of said coils, one of said thrust structures comprising an end wall of said bracket having openings therethrough spaced apart to receive said extensions slidably so that nuts screwed onto said extensions will bear against said end wall and contract the coils tangentially.

8. A restraint device according to claim 7, said end wall having at opposite ends thereof depending feet to engage leg portions of said coils that merge into the rod end portions of said other pair and hold the same substantially in the respective diametrical planes of said extensions, said leg portions being bent outward and upward from said feet so as to extend across the outer sides of said rod end portions of said one pair.

9. A restraint device according to claim 1, 2, 3, or 4, said coils and said end portions thereof being constituted by two separate rods aforesaid pre-bent each to substantially completely circular form with end portions thereof crossing in and extending substantially tangentially from said region.

10. A restraint device according to claim 2, said coils and said rod end portions being formed by a single unitary rod aforesaid pre-bent to a U-shaped form consisting of two parallel coiled lengths from which respective leg portions and substantially straight extensions of the rod extend substantially tangentially in crossed relation in said region with an axially disposed base portion interconnecting ends of said leg portions and formed to hook upon one of said thrust structures, said extensions lying at the inner sides of said leg portions and passing through openings in the other of said thrust structures and being screw-threaded to receive nuts for drawing them to high tension against said bracket and said base portion.

11. A restraint device according to claim 1, 2, 3, or 6, said coils and said rod end portions being formed by a plurality of rods aforesaid each of which is pre-bent to a U-shaped form consisting of two laterally spaced curved lengths which constitute an arcuate section of said coil and from at least one end of which extend respective leg portions interconnected at their ends by an axially disposed base portion of the rod, each two of said rods that have adjacent ends away from said bracket comprising at such ends thereof respective leg portions that cross one another and respective, oppositely disposed base portions joined together by a rigid strut plate, said strut plate being formed to bridge said sealing coupling axially and having at opposite sides of the plate oppositely directed structures to hook and hold under tension said respective base portions of the two rods; whereby the restraint device is retrofittable onto pipes coupled end to end.

12. A restraint device according to claim 11, said leg portions of one of the rods at said strut plate being spaced apart farther than and extending across the outer sides of said leg portions at said strut plate of the other rod engaged with the plate.

13. A restraint device according to claim 1, 2, 3, or 4, for pipes of about 4 inches outside diameter, each said rod being a round steel rod of about 0.2 inch in diameter.

14. A restraint device according to claim 1, 2, 3, or 4, for pipes of about 10 inches outside diameter, each said rod being a round steel rod of about 0.3 inch in diameter.

15. A restraint device according to claim 1, 2, 3, or 4, said axial restraining means comprising at least one unitary arcuate tying member for bridging said sealing coupling and engaging with said pipe surfaces and said curved rod lengths to prevent said coils from being displaced axially from said distance of spacing.

16. A restraint device according to claim 15, each said arcuate tying member having a body portion formed to span said sealing coupling axially and having along the opposite end borders of said body portion radially depressed arcuate channel formations to receive said curved lengths and be gripped by them against said pipe surfaces.

17. A restraint device according to claim 16, each said tying member being a unitary deformed rigid piece presenting along its said channel formations series of openings separated by narrow axially disposed rigid strips spaced apart to underlie said curved lengths and concentrate their pressure at a multitude of local areas about said pipe surfaces.

18. A restraint device according to claim 16, each said tying member comprising an arcuate series of downturned support lips formed to bear against said pipe surfaces between said body portion and said channel formations of the tying member.

19. A restraint device according to claim 1, 2, 3, or 4, for a pipe joint wherein the sealing coupling comprises an elastomer gasket to fit between and having cylindrical sleeve portions to receive the pipe ends and to be pressed and sealed against them by a flexible shield clampable about the gasket, said axial restraining means including a said shield comprising a unitary band of sheet metal having a body portion formed to span axially and to be wrapped circumferentially about said gasket and having along the opposite borders of said body portion depressed lateral extensions constituting channel formations to receive said coils and be gripped by them against said pipe surfaces; and means on the ends of said body portion for contracting said band about the gasket and thereby pressing the gasket into sealing engagement with the pipe ends.

20. A restraint device according to claim 19, said lateral extensions each having a multitude of openings therethrough which are spaced apart along the bottom of the respective channel formation by axially disposed metal strips that will underlie one of said coils and concentrate its pressure at a multitude of local areas about said pipe surfaces.

21. A restraint device according to claim 19, said band being made of plastically stretchable sheet metal and being preformed with said depressed lateral extensions, said body portion having a length slightly less than the outside circumference of said gasket, said contracting means being operable to stretch said body portion into a substantially closed cylinder about and thus compress the gasket.

22. A restraint device according to claim 21, and an arcuate piece of thin sheet metal to underlie the ends of said body portion and bridge the gap between them as they are contracted toward each other.

23. A restraint device according to claim 21, said contracting means comprising across each of the ends of said band a bar member having an end portion of said band fixed thereto and means interconnecting the two bar members for drawing them tangentially toward each other.

24. A restraint device according to claim 23, each said bar member comprising confronting channel bars one fitting inside the other with a said band end portion wrapped about the one bar and clamped to it by the other bar.

25. A restraint device according to claim 24, said interconnecting means comprising at least one bolt extending through all the said channel bars and a tightening nut on each bolt.

26. A restraint device according to claim 21, said band being formed of heat treated chromium-nickel stainless steel sheeting having a thickness of about 0.008 to 0.014 inch, said body portion in place on said gasket being stretchable plastically by said contracting means to a length increase of about 0.2 to about 0.6 inch.

27. A restraint device according to claim 21, said contracting means protruding accessibly from said band through the space between said coils.

28. In a restraint device to prevent axial separation of two cast iron soil pipes or the like joined end to end by a sealing coupling,
a unitary stiff yet forceably springable rod pre-bent into a shape consisting of two parallel substantially completely circular coils from each of which extend substantially tangentially in crossed relation a leg portion and a substantially straight end portion of the rod with the respective leg portions extending into and interconnected by an axially disposed base portion of the rod;
said coils having a diameter and being spaced apart axially a distance sufficient for said coils to encircle respective surfaces of said pipes that border said coupling at opposite sides of said coupling, each of said coils having substantially its entire length disposed on a single plane perpendicular to the axis of said coils; and
means for displacing said rod end portions relative to said leg portions substantially tangentially and holding them displaced under tension sufficiently great to contract said coils into immovable tight engagement upon said pipe surfaces;

said displacing means comprising a rigid strut bracket formed to bridge said sealing coupling axially and having on one side thereof a rigid substantially tangential tongue portion formed with an axially disposed groove to hook under said base portion of said rod, said bracket having on the opposite side thereof a rigid thrust structure formed with openings therein through which said rod end portions extend to means thereon for displacing said end portions and holding them displaced longitudinally relative to said bracket, said thrust structure having feet depending from its opposite ends, said leg portions being disposed at respective inner sides of said feet and spaced beneath said end portions and extending from said feet upwardly and outwardly outside said end portions to said base portion on said tongue portion of said bracket.

* * * * *